United States Patent [19]

Ishii et al.

[11] Patent Number: 4,873,714

[45] Date of Patent: Oct. 10, 1989

[54] SPEECH RECOGNITION SYSTEM WITH AN ACCURATE RECOGNITION FUNCTION

[75] Inventors: Takaaki Ishii, Sagamihara; Toru Kuge, Tokyo, both of Japan

[73] Assignee: Kabushiki Kaisha Toshiba, Kawasaki, Japan

[21] Appl. No.: 933,213

[22] Filed: Nov. 21, 1986

[30] Foreign Application Priority Data

Nov. 26, 1985 [JP] Japan .............................. 60-181654[U]
Nov. 26, 1985 [JP] Japan ................................. 60-265502
Dec. 20, 1985 [JP] Japan ................................. 60-287434

[51] Int. Cl.⁴ ........................ H04M 1/26; H04M 1/56
[52] U.S. Cl. ....................................... 379/88; 379/58; 379/63; 379/354
[58] Field of Search ................... 379/88, 355, 354, 58, 379/63

[56] References Cited

U.S. PATENT DOCUMENTS

| | | | |
|---|---|---|---|
| 4,348,550 | 9/1982 | Pirz et al. | 379/357 |
| 4,461,023 | 7/1984 | Katayama | 381/43 |
| 4,525,793 | 6/1985 | Stackhouse | 364/513.5 |
| 4,644,107 | 2/1987 | Clowes et al. | 379/354 |
| 4,731,811 | 3/1988 | Dubus | 379/58 |

FOREIGN PATENT DOCUMENTS

| | | | |
|---|---|---|---|
| 0012463 | 1/1983 | Japan | 379/354 |
| 0225656 | 12/1984 | Japan | 379/355 |
| 0085655 | 5/1985 | Japan | 379/63 |
| 0035659 | 2/1986 | Japan | 379/356 |
| 974850 | 6/1963 | United Kingdom | 379/88 |

OTHER PUBLICATIONS

Wescon 83 Conference Record, 8th-11th Nov. 1983, San Francisco, pp. 11/4/1-11/4/3, Western Periodical Co., North Hollywood, US; D. Kelley: "Voice Recognition is User Friendly", p. 11/4/1, right-hand column, lines 19,20*.
Electrical Communication, vol. 59, No. 3, 1985, pp. 281-285, Harlow, GB; M. Immendeofer: "Voice Dialer" * pp. 283, 284: Features of the voice dialer; p. 283, left-hand column, lines 18-50*.
Japan Telecommunications Review, vol. 24, No. 3, Jul. 1982, pp. 267-274, Tokyo, JP; N. Ishii et al.: "Speaker-Independent Speech Recognition Unit Development for Telephone Line Use", * p. 269, left-hand column, lines 11-22*.

Primary Examiner—Thomas W. Brown
Attorney, Agent, or Firm—Oblon, Spivak, McClelland, Maier & Neustadt

[57] ABSTRACT

A speech registration/recognition processing section is responsive to a speech input signal to be registered or recognized from a microphone to selectively subject the speech input signal to a registration or a recognition processing, in which upon the registration processing the speech input signal is allowed to be stored as recognition data and upon the recognition processing the speech input signal is compared to the recognition data stored. A speech record/reproduction processing section is responsive to the speech input signal from the microphone to subject the speech input signal to a record/reproduction processing, in which upon the record processing the speech input signal is recorded as a record signal and upon the reproduction processing the record signal is delivered as a reproduction signal. A speaker is supplied with the reproduction signal. A control section is provided, in accordance with a registration or a recognition mode designation signal, for setting the the speech registration/recognition processing section to the registration or the recognition processing and for setting the speech record/reproduction processing section to the record or the reproduction processing corresponding to the registration or the recognition processing at which the speech registration/recognition processing section is placed.

6 Claims, 8 Drawing Sheets

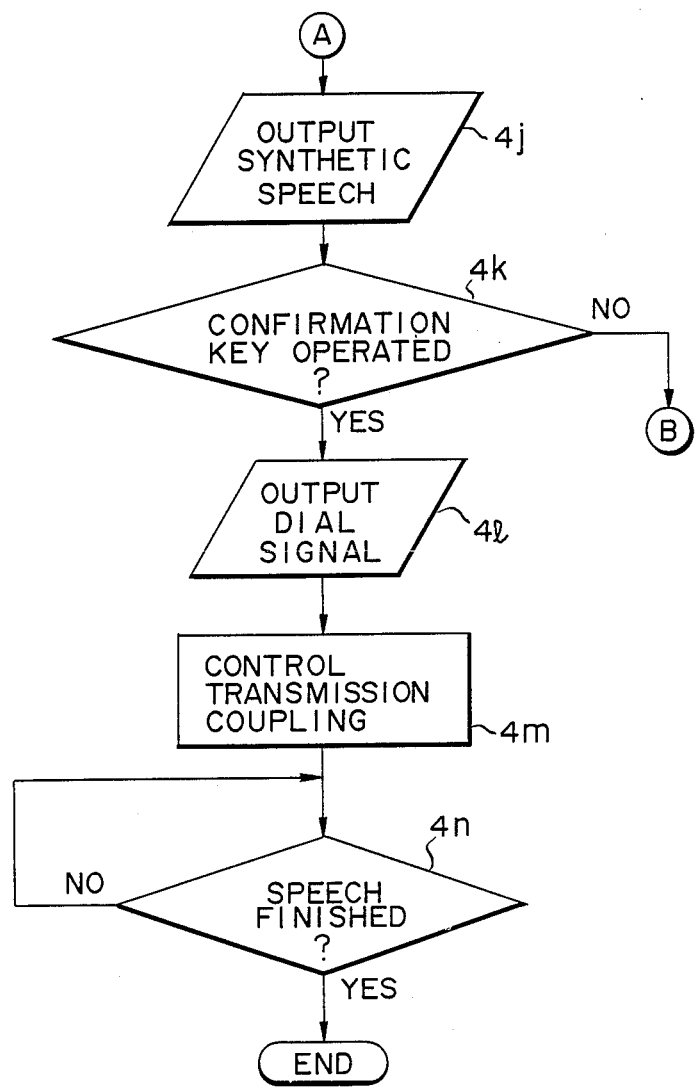

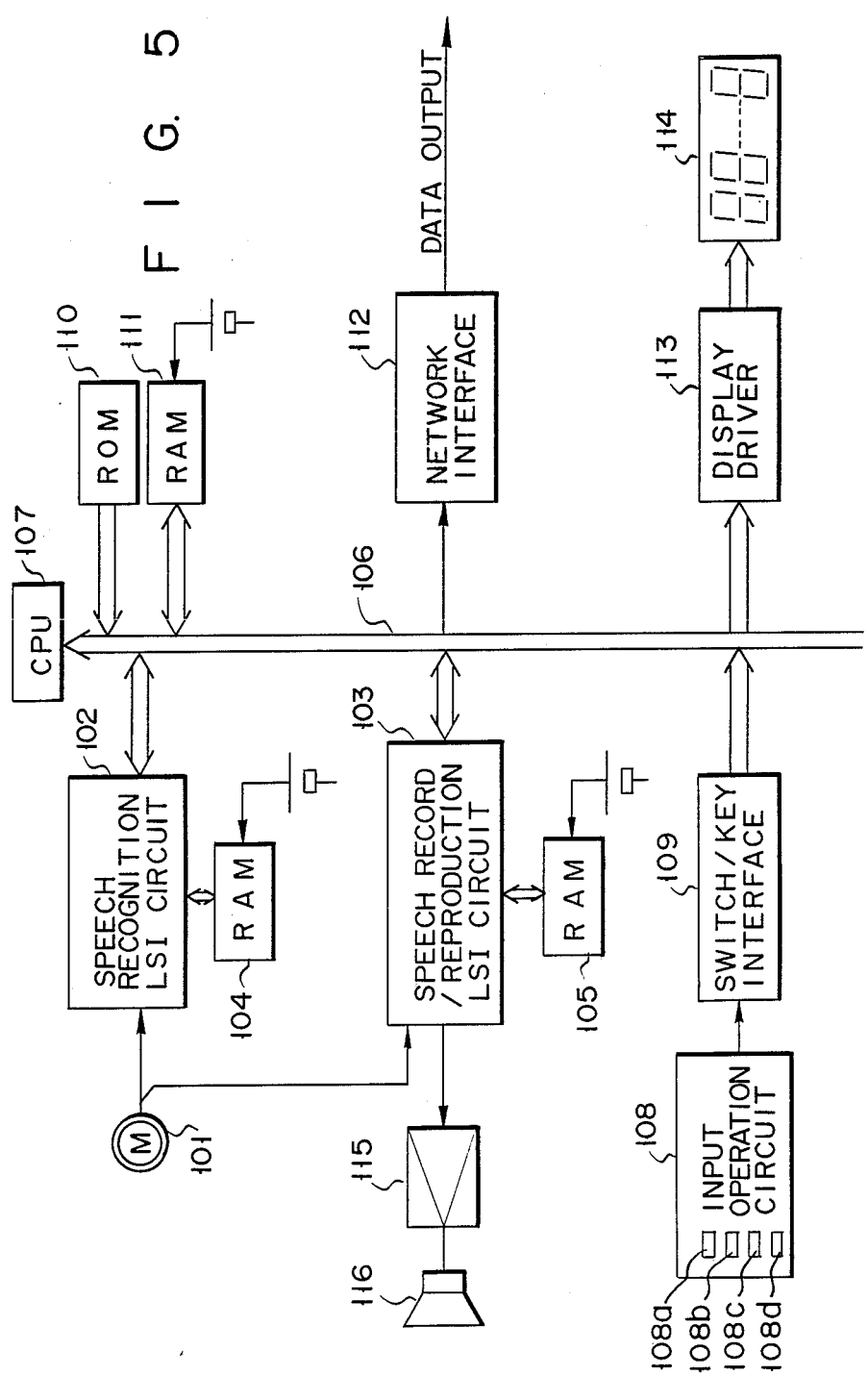

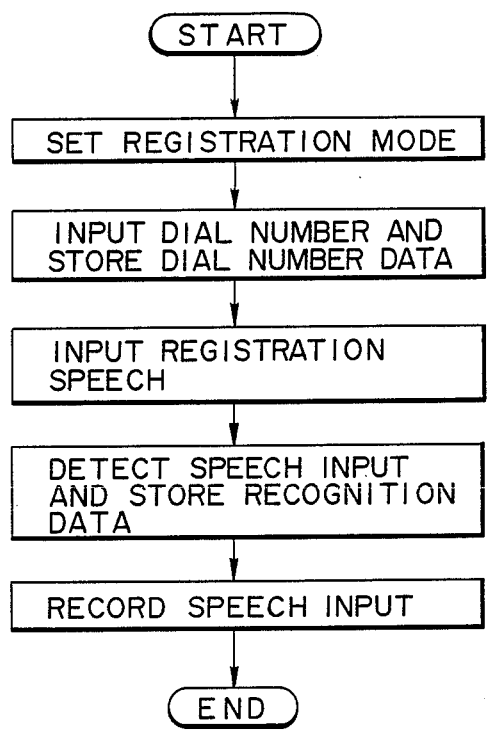

SPEECH RECOGNITION SYSTEM WITH AN ACCURATE RECOGNITION FUNCTION

BACKGROUND OF THE INVENTION

This invention relates to a speech recognition system with an accurate recognition function, and in particular, to a system as one kind of data input device with an accurate recognition function which can eliminate any recognition error.

A conventional speech recognition system of this type comprises a microphone for inputting speech, a speech recognition circuit for registering and recognizing the speech input signal from the microphone, a central processing unit (CPU) for reading a recognition output from the speech recognition circuit and allowing data corresponding to the recognition data to be transmitted to a speech synthesizer via a data bus, a speech synthesizer for receiving data from the CPU and synthesizing the speech from the data, and a speaker for outputting the speech which is synthesized by the speech synthesizer.

According to this system, the user can input data and give an instruction without using his hands, and in fact, it proves very useful when applied to an input device. In this system, however, whether or not the recognition output from the speech recognition circuit is wrong is ascertained by the output of the speech synthesizer. Only predetermined speech patterns are written with respect to the speech synthesizer, placing some restriction upon the speech inputs through the speaker Since the input speech does not always coincide with the registered speech patterns, it is difficult for the user to ascertain their coincidence. This causes uneasiness in the user. During the speech registration process, it is necessary to register the speech input at a predetermined address position in a memory of the speech recognition circuit, thus involving a cumbersome operation.

Furthermore, since with respect to a respective word or clause one kind of speech pattern is registered for comparison with the speech input, even if the same user inputs his own speech, it is not often successfully recognized due to ambient noise and the delicately varying speech input characteristic. Where, in particular, the speech recognition system is employed as an input device for a mobile station such as in a moving vehicle, the speech is liable to be varied due to the acoustic circumstances within the narrow confines of the vehicle compartment and the traffic noise on the road, resulting in a poor recognition percentage.

Where the speech recognition system is used as the input device for automobile telephones, the telephone set per se never has a speech recognition ascertaining function and, therefore, it is not possible for the user to ascertain that the speech input has been correctly recognized, unless it is sent back from a central station.

SUMMARY OF THE INVENTION

It is accordingly an object of this invention to provide a new and improved speech recognition system with an accurate recognition function, which can momentarily ascertain speech input on the basis of speech patterns initially registered at the time of registration and can register speech input in a memory at any desired address position, thus assuring ease of operation by the user.

According to this invention, a speech recognition system with an accurate recognition function is provided which comprises:

a microphone for producing a speech signal to be registered or recognized;

a speech registration/recognition processing section, responsive to the speech input signal from the microphone, to selectively subject the speech input signal to a registration or a recognition processing, in which upon the registration processing the speech input signal is allowed to be stored as recognition data and upon the recognition processing the speech input signal is compared to the recognition data stored;

a speech record/reproduction processing section responsive to the speech input signal from the microphone to subject the speech input signal to a record/reproduction processing, in which upon the record processing the speech input signal is recorded as a record signal and upon the reproduction processing the record signal is delivered as a reproduction signal;

a speaker to which the reproduction signal is supplied;

a mode designation section for delivering a registration or a recognition mode designation signal; and a control section, in accordance with the registration or the recognition mode designation signal, for setting the speech registration/recognition processing section to the registration or the recognition processing and for setting the speech record/reproduction processing section to the record or the reproduction processing corresponding to the register or the recognition processing at which the speech registration/recognition processing section is placed.

BRIEF DESCRIPTION OF THE DRAWINGS

These and other objects and features of this invention can be understood through the following embodiments by reference to the accompanying drawings in which:

FIGS. 4A and 4B illustrate flow charts showing the control procedure and contents of the CPU in FIG. 3;

FIG. 5 is a circuit diagram showing the arrangement of a speech recognition system, according to a second embodiment of this invention, as applied to a telephone apparatus;

FIGS. 6 and 7 illustrate flow charts showing the operation of the second embodiment.

DETAILED DESCRIPTION OF THE PREFERRED EMBODIMENTS

Figure 1:
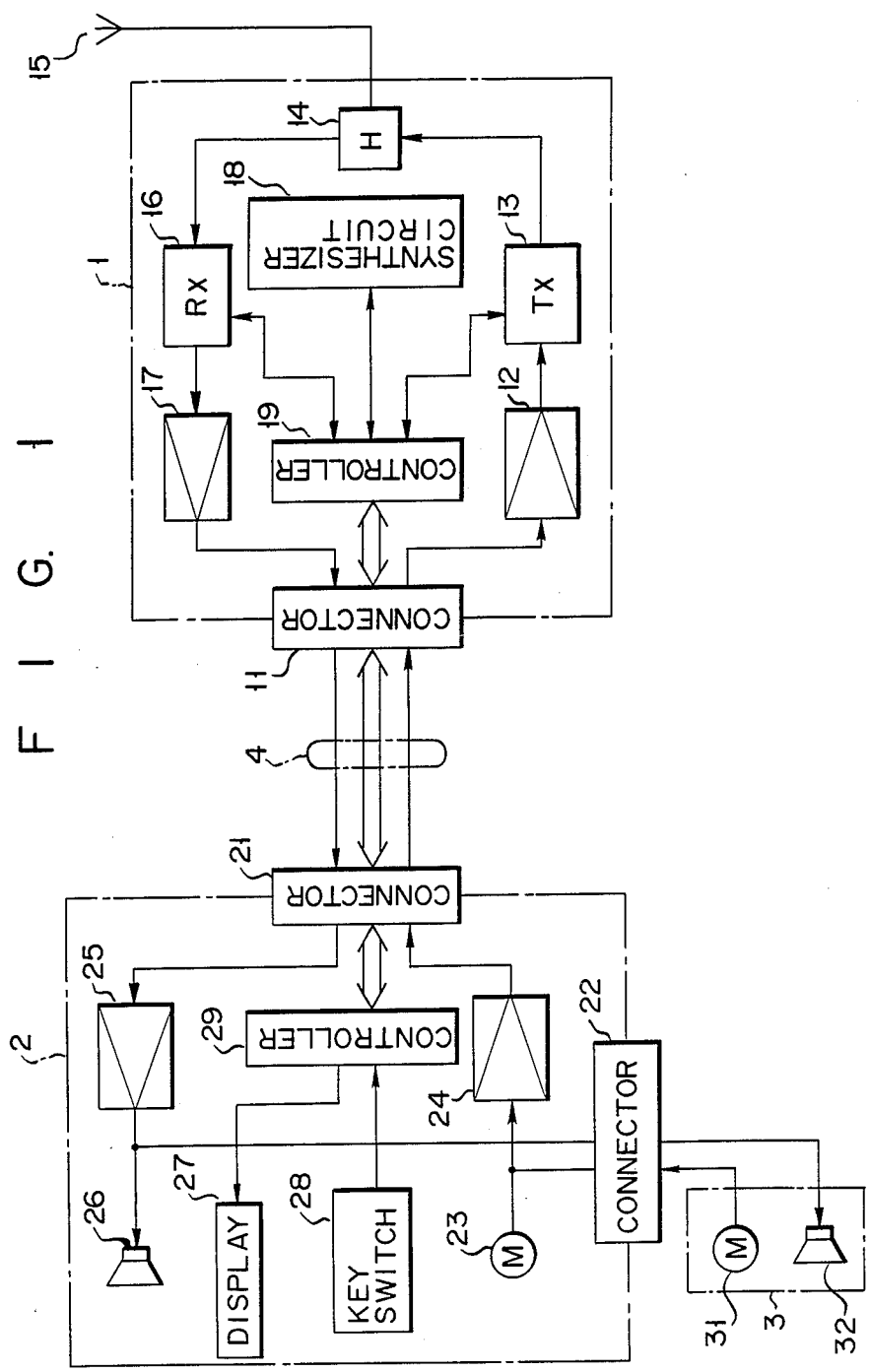
FIG. 1 is a block diagram showing a speech recognition system, according to a first embodiment of this invention, as applied to a wireless telephone apparatus.

FIG. 1 shows a circuit arrangement of a speech recognition system according to one embodiment of this invention as being applied to a wireless telephone apparatus. The speech recognition system comprises transmit/receive unit 1, control unit 2 connected to transmit/receive unit 1 through connection cord 4, and headphone type hands-free unit 3.

Transmit/receive unit 1 receives a speech signal sent from control unit 2 through connection cord 4 and connector 11. The speech signal is supplied through amplifier 12 to transmit circuit 13 where it is modulated. The modulated signal is transmitted from antenna 15 to a communication line after it has been passed through common circuit 14.

A signal sent from a telephone apparatus by a called subscriber is received by receive circuit 16 through antenna 15 and common circuit 14. The received signal is, after being amplified by amplifier 17, sent to control unit 2 through connector 11 and connection cord 4. The transmit/receive unit includes synthesizer circuit 18 for designating the transmit and receive channels of transmit and receive circuits 13 and 16, as well as controller 19 as set out below.

Control unit 2 includes microphone 23 as a part of the transmitter and speaker 26 as a part of the receiver. A transmit signal is input through microphone 23 and, after being amplified by amplifier 24, it is sent through connector 21 and connection cord 4 to transmit/receive unit 1. A receive signal, on the other hand, is sent from transmit/receive unit 1 through connection cord 4 and connector 21 to amplifier 25 where it is amplified. The amplified output is delivered to speaker 26 where audible as speech. Control unit 2 includes display 27 made of a liquid crystal, key switch 28 and controller 29. These circuit elements allow a telephone number, input at the time of making a call, to be displayed. Connector 22 links hands-free unit 3 to control unit 2.

Figure 2:
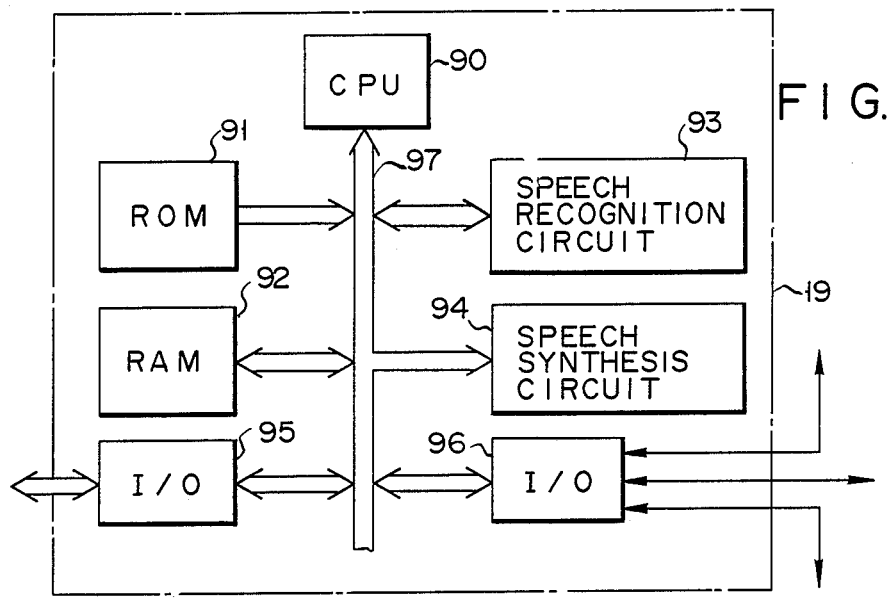
FIG. 2 is a block diagram showing the arrangement of a controller in a transmit/receive unit.

Controller 19 in transmit/receive unit 1 is configured as shown in FIG. 2. That is, controller 19 includes main control section (CPU) 90, comprised of a microprocessor and connected via bus 97 to program ROM 91, RAM 92 for data storage, speech recognition circuit 93 and speech synthesizer circuit (speech synthesizer circuit) 94. Controller 19 further includes input/output (I/O) circuit 95 for data transfer to and from control unit 2 as well as input/output (I/O) circuit 96 for data transfer to and from synthesizer circuit 18, transmit circuit 13 and receive circuit 16.

Figure 3:
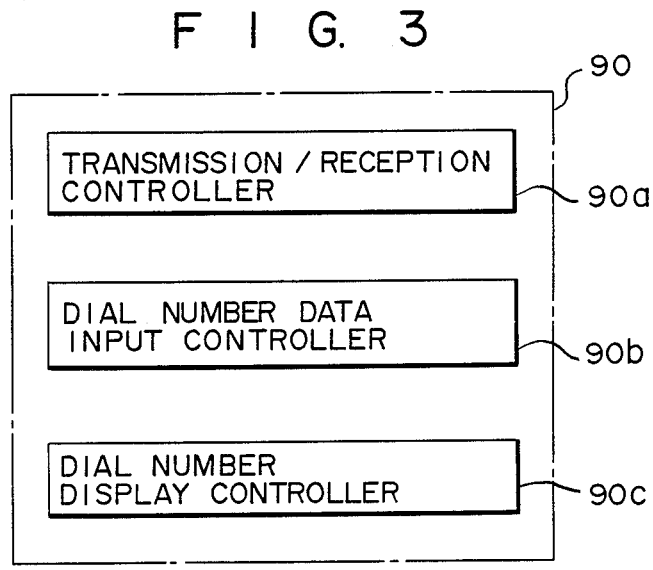
FIG. 3 is a block diagram showing the functional arrangement of a CPU in the controller of FIG. 2.

As shown in FIG. 3, CPU 90 includes, as main functions, transmission/reception controller 90a for controlling a transmit/receive operation, dial number data input controller 90b and dial number display controller 90c. Dial number data input controller 90b permits a call from the user to be input from microphone 31 in hands-free unit 3 and permits dial number speech data, sent through control unit 2 and connection cord 4, to be received via transmit circuit 13, so that the dial number speech input data is recognized by speech recognition circuit 93 to generate dial number code data representing the speech data. Dial number display controller 90c supplies code data of the dial number which has been obtained by dial number data input controller 90b to speech synthesizer circuit 94 where the dial number is converted to speech data. This dial number speech data is sent through control unit 2 to hands-free unit 3 where it is sounded, as an output, from speaker 32. Dial number display controller 90c supplies the code data of the aforementioned dial number of display 27 in control unit 27.

The operation of the aforementioned apparatus will be explained below in accordance with the control procedure of CPU 90 in controller 19.

Prior to using the apparatus, a subscriber registers his own speech patterns in speech recognition circuit 93 by initially inputting his own voice, saying the dial numbers.

Figure 4A:
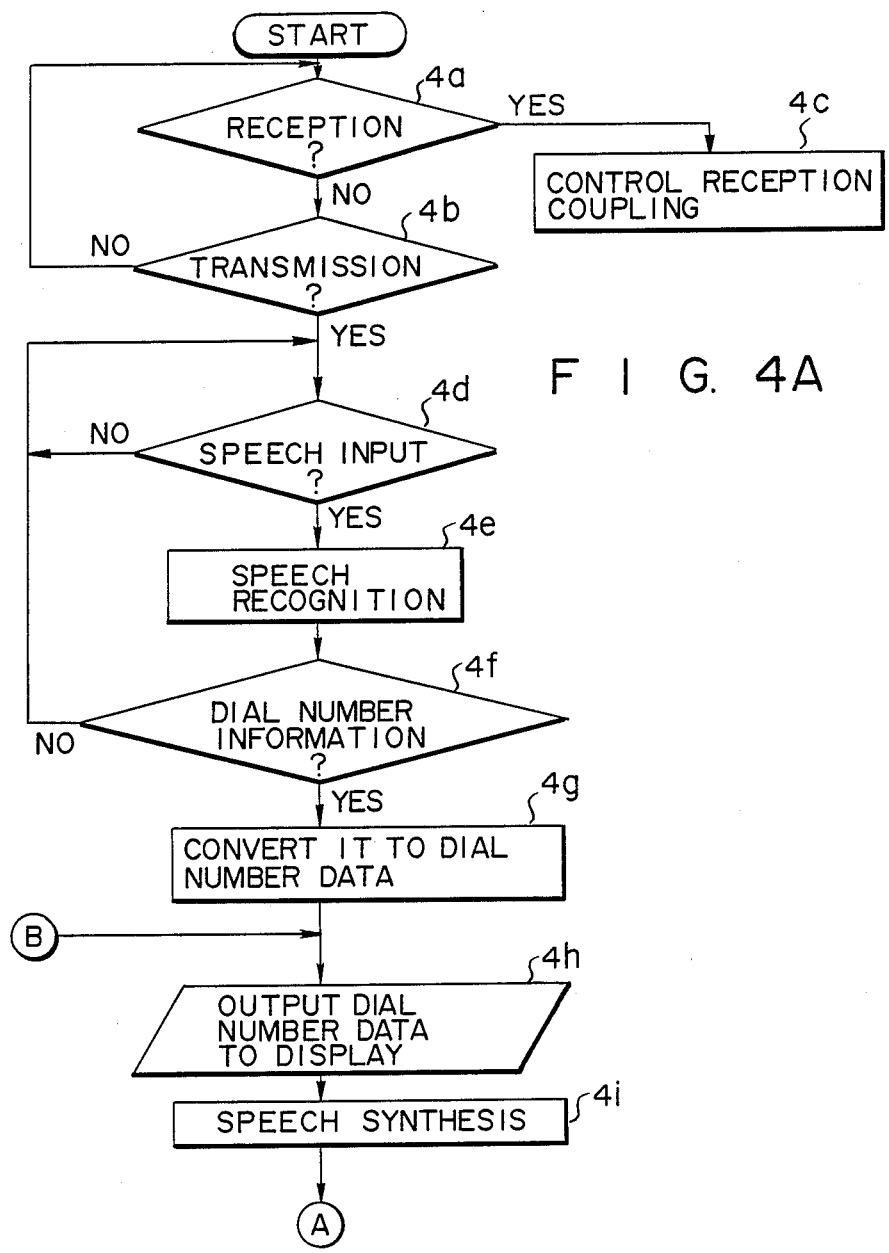

In the "wait" state, CPU 90 repeatedly monitors incoming and outgoing signals at steps 4a and 4b as shown in FIG. 4A. If in this state the subscriber issues a calling instruction through the operation of, for example, any keys on key switch 28, then the instruction data is sent from controller 29 in control unit 2 to controller 19 in transmit/receive unit 1 through connection cord 4. By so doing, CPU 90 in control circuit 19 detects the issuance of the calling instruction at step 4b and the process goes to step 4d to await voice input entry of the dial number speech data. When the subscriber inputs the dial number with his own voice through microphone 31 in hands-free unit 3, CPU 90 permits the dial number speech data to be input, digit by digit, from transmit circuit 13 through input/output circuit 96 to speech recognition circuit 93 for speech recognition at step 4e. When voice input which represents, for example, the dial number "03-123-4567," the data "zero", "three", "one"... are entered, digit by digit, in that order to speech recognition circuit 93 where the data is compared to the initially-entered speech patterns to allow the data of the corresponding speech pattern to be put to an associated circuits. Upon the completion of speech recognition with respect to the entire digit patterns, the process goes to step 4f at which judgment is made as to whether or not there exists dial number information involved. When there is no corresponding dial number or a wrong dial number, the process goes back to step 4d at which the monitoring operation is performed for speech input. When an incoming signal appears in the aforementioned wait time, CPU 90 goes to step 4c where a reception coupling control operation is performed in a predetermined procedure to establish a conversation circuit.

Where the dial number is recognized, CPU 90 converts the dial number speech pattern data to character code data at step 4g. At step 4h, the data is sent to controller 29 in control unit 2. At step 4l, the character code data of the aforementioned dial number is fed to speech synthesizer circuit 94 to generate corresponding speech. As shown in FIG. 4B, at step 4j the speech data is sent through control unit 2 to hands-free unit 3 and output from speaker 32 in hands-free unit 3. The input dial number is a acknowledged both through the visual display by display 27 and through the audible signal from speaker 32 in hands-free unit 3.

When the subscriber confirms the dial number on the display and operates a confirm key on key switch 28, CPU 90 detects the operation data of the confirm key at step 4k. At step 4l, a dial signal is delivered from transmit circuit 13 on the basis of the character code data of the aforementioned dial number. At step 4m a transmit/receive control operation necessary for connection to the called subscriber is performed in the predetermined procedure to establish a conversation circuit at the completion of that control operation, noting that, during a talking phase, CPU 90 monitors speech termination at step 4n and the process goes back to steps 4a and 4b at the termination of conversation.

In the embodiment of this invention, when a dial number is entered at the time of making a call, the dial number is converted to speech data in speech synthesizer circuit 94 in the subscriber's telephone apparatus so that it is produced from speaker 32 in hands-free unit 3. The subscriber, when hearing the speech from speaker 32, can confirm the "now entered" dial number, unless it is sent back from a central station as a mobile network. Even if, therefore, a call is made from a mobile station, such as a moving vehicle, the caller can confirm the dial number without having to look at display 27. The subscriber can perform a dialing operation without endangering his safety. Under any circumstances, it is possible for the subscriber to confirm the dial number and thus largely reduce the occurrence of a "wrong number". In other words, a correct call can normally be made to the called subscriber. Furthermore, according to this embodiment, the dialed number can be confirmed to the calling subscriber by means of both an audible signal and visual display and, even if the subscriber fails to hear the audible dial number acknowledgement, he can still visually confirm the number on display 27.

Although in the aforementioned embodiment the entry of the dial number data has been explained as being made by spoken word, the same data can also be input through the key switch as required.

Although in the aforementioned embodiment the entry of the dial number data and display of speech data have been explained as being made by microphone 31 and speaker 32 in headphone type hands-free unit 3, these may be done through microphone 23 and speaker 26 in control unit 2. Furthermore, the entry of the dial number data may be made by inputting the dial number in an uncurtailed format or by inputting the dial number, if necessary, with the name of the called subscriber, in a curtailed format, in which case CPU 90 determines how the input signal can be converted to the corresponding dial number. The speech recognition and synthesis etc., of the dial number may be made by virtue of controller 19 in the transmit/receive unit or controller 29 in control unit 2.

Although, in the aforementioned embodiment, subsequent to the entry of the dial number and its judgment for correctness, the conversion to speech is implemented to allow the whole dial number to be output from speaker 32 in hands-free unit 3, the dial number may be converted to corresponding speech data for each individual digit entry so that it can be output from speaker 32. The control procedure and contents of the CPU, configuration and type of the telephone apparatus, configuration of the dial number speech display means, and so on may be properly combined in a variety of ways.

A speech recognition system as applied to a wireless telephone apparatus will not be explained below in connection with second and third embodiments of this invention.

FIG. 5 shows a speech recognition system according to a second embodiment of this invention which can positively ascertain whether or not speech data recognized is correct, without causing any uneasy or uncomfortable feeling in subscribers, a situation which has been encountered in the conventional apparatus.

In FIG. 5 microphone 101 is connected to specified subscriber's speech recognition LSI circuit 102 and speech record/reproduction LSI circuit 103. RAM's 104 and 105 for data storage are connected to LSI circuits 102 and 103, respectively, which in turn are connected via data bus 106 to processing circuit (CPU) 107. CPU 107 is adapted to perform predetermined control processings necessary for telephone apparatuses, such as the registering, recognition and reproduction (acknowledge). Input operation circuit 108 is connected via switch/key interface 109 to data bus 106 and includes mode select switch 108a, ten keys 108b for telephone number registry, confirm key 108c and negation key 108d. To data bus 106 are connected ROM 110 for storing programs necessary for the aforementioned control processings, RAM 111 for telephone number storage and communication line interface 112. Display 114 is connected via display driver 113 to data bus 106. Speaker 116 for producing a reproduction speech is connected through amplifier 115 to speech record/reproduction LSI circuit 103.

The LSI circuits 102 and 103 are conventional and may be made with various LSI's which are readily available, for example, T6658a (Toshiba) for circuit 102 and TC8830 (Toshiba) for circuit 103. For the internal configuration and detailed connections reference is invited to the technical data attached to T6658A and TC8830, noting that the same thing is also true of a third embodiment as set out below.

The operation of the aforementioned embodiment will be explained below.

At the time of registry, the user first sets this apparatus to a speech registration mode through the operation of input operation circuit 108. Then he inputs the telephone number data of the called subscriber through the operation of ten keys on input operation circuit 108 at the time of making a call. The telephone number data thus input is stored in RAM 111 under the control of CPU 107. Then the user inputs the registered speech, such as the name of the called subscriber, by speaking into microphone 101. The voice input of the user is detected by detecting that the voltage level of the input signal exceeds a predetermined threshold level. The detected voice input is stored as recognition data in RAM 104 under the control of CPU 107. Concurrently the utterance input is delivered as record data from microphone 101 through speech record/recognition LSI circuit 103 to RAM 105, under the control of CPU 107, where it is stored. The aforementioned register processing is repeated a necessary number of times. A tape recorder may be employed in place of speech record/ reproduction LSI circuit 103.

After the apparatus has been set to the speech recognition mode through the operation of the switch on input operation circuit 108, the user speaks a corresponding recognition word into microphone 101 in the same way as set forth above. Upon receipt of the output from microphone 101, speech recognition LSI circuit 102 delivers a recognition signal, as an interrupt signal, to CPU 107 in which case the output from the microphone 101 is not coupled to speech record/reproduction LSI circuit 103. CPU 107 reads the recognition data corresponding to the recognition speech from RAM 104 through speech recognition LSI circuit 102. CPU 107 issues an instruction for reading the record data corresponding to the read-out recognition data from RAM 105 to permit reproduction, as well as an instruction for reading the called subscriber's telephone number data corresponding to the recognition data from RAM 111 and supplying it to display driver 113 for display. By so doing, the user can judge whether or not the recognition data is correct on the basis of the reproduction speech from speaker 116, without causing nay uneasiness in the user, noting that the reproduced speech is not a restricted synthesized one as in the conventional apparatus, but his own speech, which is of importance according to this invention. In addition to this judgment the user can also ascertain it, as required, on display 114.

Where the user recognizes the aforementioned judgment as being correct, CPU 107 allows the called subscriber's telephone number data corresponding to the recognition data to be read out of RAM 111 by a "confirmed" response, or a lack of response over a predetermined period of time, from confirm key 108c on input operation circuit 108, except in the case of a mere initial acknowledgement, so that it may be fed to network interface 112.

Where the user recognizes the aforementioned judgment as being wrong, CPU 107 delivers a tone of speech data representing a negation or cancellation response made through the operation of negation key 108d on input operation circuit 108 and, at the same time allows the initial state to be regained, in place of the speech recognition mode, with display 114 extinguished. In this case, a registration is made, as required, in the aforementioned registration mode.

Figure 7:
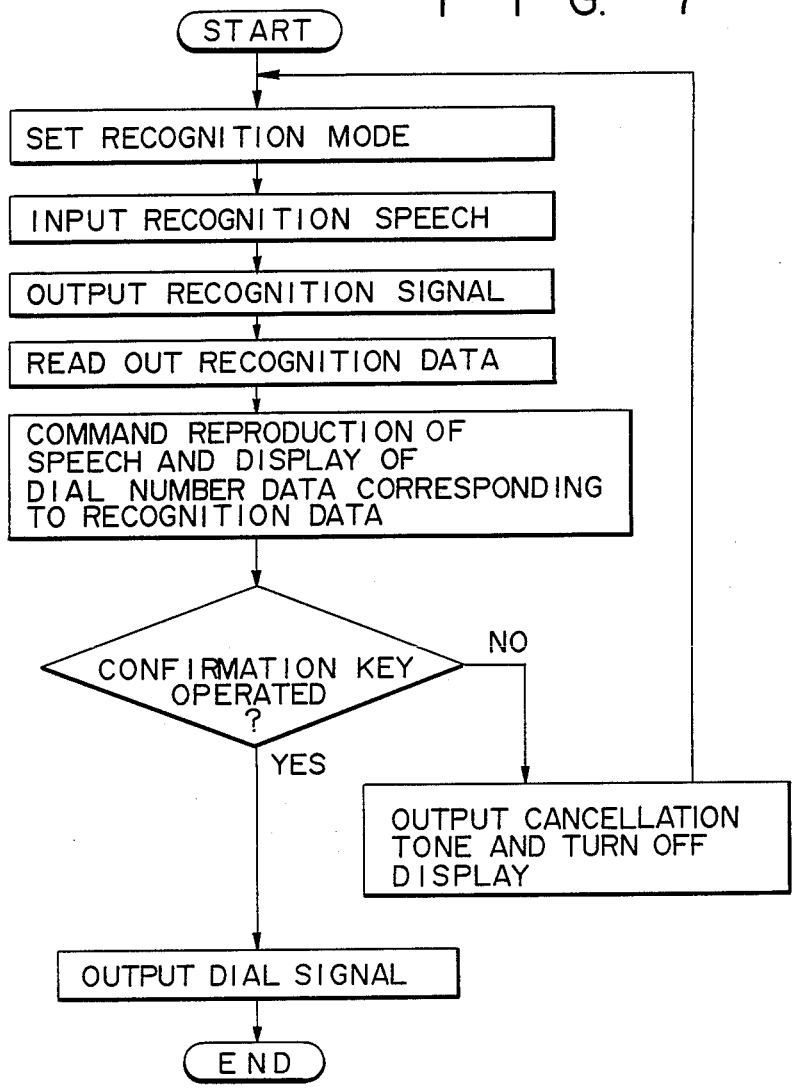

FIGS. 6 and 7 shown flow charts corresponding to registration and recognition modes, respectively.

The user can register his own speech data in any desired address position through the registration/ reproduction LSI circuit, thus assuring a ready system operation.

As set out above, according to this invention the speech contents upon registry can be made coincident with the speech contents upon recognition and at the same time the speech input can be registered by the user in any desired address position, whereby a ready availability and operability are assured.

Since, in particular, a call is made over the telephone through the verbalization of the subscriber's name, the incidence of "wrong number" can positively be prevented according to this invention.

Figure 8:
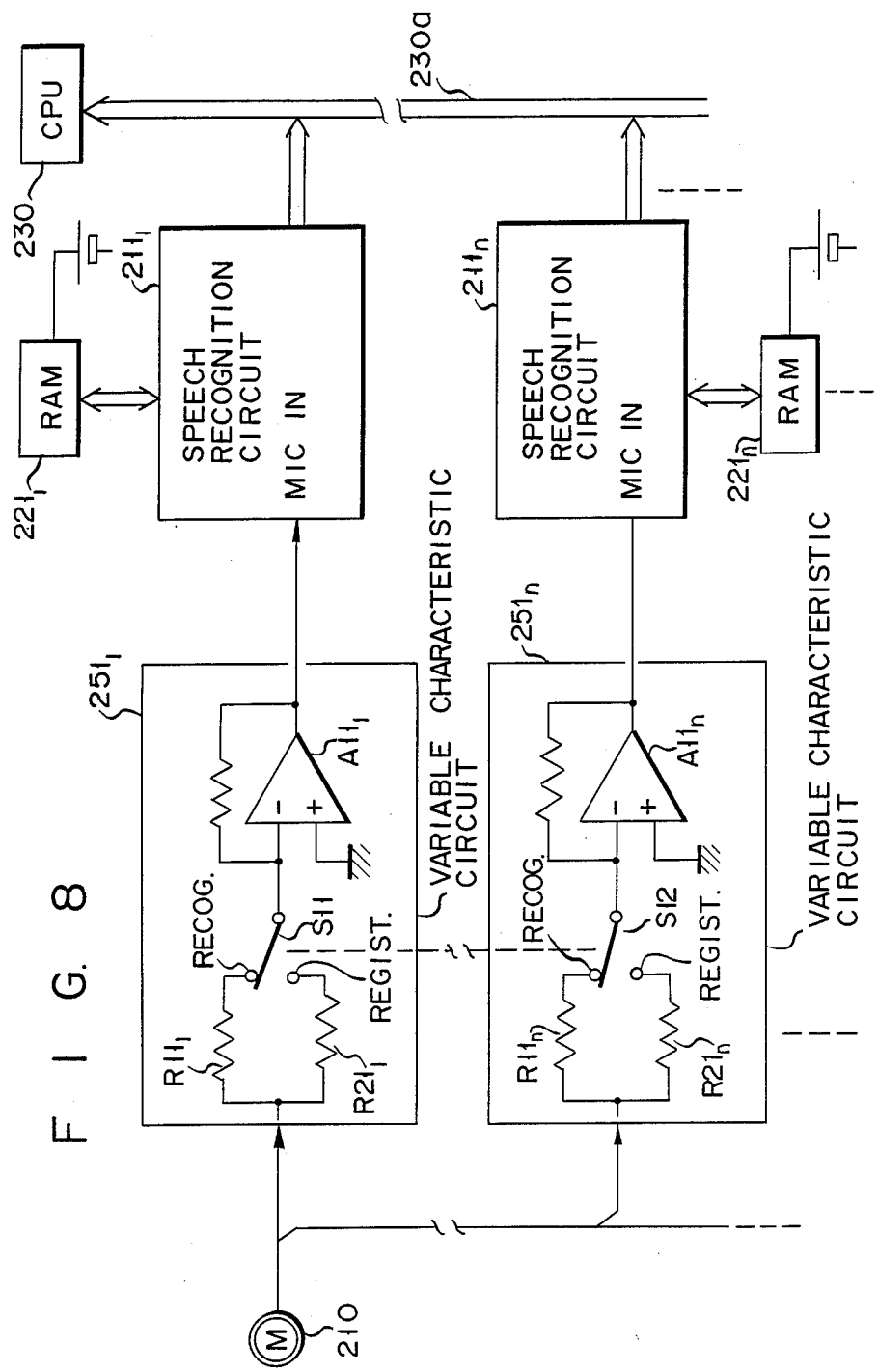
FIG. 8 is a block diagram showing a speech recognition system according to a third embodiment of this invention.

FIG. 8 shows, as a third embodiment of this invention, the major section of a speech recognition system having the function of positively recognizing spoken word when it is affected by the manner of speaking as well as by the circumstances under which it is spoken.

The speech recognition system includes a plurality of speech recognition circuits $211_1 \ldots 211_n$ and a corresponding number of variable characteristic circuits $251_1 \ldots 251_n$. Speech recognition circuits $211_1$ $211_n$; are connected to speech registration RAM's $211_1$, $221_n$, where a plurality of modified speech patterns are stored for each word or each clause. The modified speech patterns include, as the characteristics of the speech, the magnitudes of sound volumes, the varying lengths of sounds, the variation of sound intervals, the husky or somewhat masked voices, and so on. The variable characteristic circuit ($251 \ldots$ or $251_n$) is comprised of an amplifier $A11_1 \ldots$ or $A11_n$; of a different amplification factor and different bandpath characteristic, set of resistors (R11 and $R21_1, \ldots$ or $R11_n$ and $R21_n$; of 2:1 values and mode designating switch $S11_1 \ldots S11_n$ to allow the speech which is input through microphone 210 in a speech registration mode to be prepared as a variation pattern so that it is stored as such in speech recognition circuit ($211 \ldots$ or $211_n$).

When the speech is to be registered, variable characteristic circuits $251 \ldots 251_n$ and speech recognition circuits $211_1 \ldots 211_n$ are set to speech registration modes with mode designation switches S11, ... $S1_n$ set to the speech registration mode. In this state, if the user inputs a desired word through microphone 210 by saying the object work to be recognized, then the speech signal is branched to variable characteristic circuits 251 ... $251_n$ where the branched speeches are modified in accordance with their amplification factor and bandpath characteristic. If, for example, the word "one" is input through the microphone, then the sound characteristics, such as the volume, length, interval and quality for "one", are subjected to modification processing. That is, the variable characteristic circuits $251 \ldots 251_n$ prepare n kinds of speech patterns which are obtained through the arbitrary modification of the sound characteristics for "one." The respective modification speech signal is supplied to speech recognition circuits 211 ... $211_n$ so that they may be stored in speech registration RAM's 221 ... $221_n$. In this way, the speech patterns are registered for one word. The other words and clauses are so registered in exactly the same way.

When a speech registration is to be made in this system, the mode designation switches $S11_1 \ldots S11_n$ are set to the speech registration mode REGIST.

When the user inputs his speech through microphone 210 it is, after being branched, supplied respectively through variable characteristic circuits $256 \ldots 251_n$ to speech recognition circuits $211_1 \ldots 211_n$ where the aforementioned input speeches are compared to the speech patterns which have been registered in the respective RAM's $221 \ldots 22_n$. The results of comparison are fed via data bus 230a to CPU 230 where the speech recognition processing is performed based on the results of comparison. If, for example, the input speech coincides with any one of the registered speech patterns as the result of comparison, the input speech is recognized from the coincidence data.

According to this embodiment, since the input speech is compared to the plurality of modified speech patterns through speech recognition circuits $211_1 \ldots 211_n$ the speech input can be recognized with a high probability even if it is somewhat modified due to, for example, the illness of the user or the ambient noise.

Even if the user employs this system on a mobile station such as an automobile where the quality etc., of his speech is adversely affected, the speech input can be recognized with a high recognition percentage in spite of the degraded acoustic environments and noise in the moving vehicle.

Through variable characteristic circuits $251_1 \ldots 251_n$ corresponding to speech recognition circuits $211_1 \ldots 211_n$, the user has only to input a word or clause, one unit after another, by speaking, as in the case of the conventional system, making it easier for the user to perform a speech registration operation.

This invention is not restricted to the aforementioned embodiments. Although a plurality of modified speech patterns are prepared for registration through the utilization of variable characteristic circuits $251_1 \ldots 251_n$ speech recognition circuits $211_1 \ldots 211_n$ the user can input modified speeches directly through microphone 210 without utilizing the variable characteristic circuits.

With respect to the number and kinds of modified speeches, their registering means, their speech recognizing means, etc., can be changed or modified within the spirit and scope of this invention.

What is claimed is:

1. A speech recognition system with an accurate recognition function, said speech recognition system comprising:
microphone means for producing speech input signals to be registered or recognized of various users;

speech registration/recognition processing means responsive to a speech input signal from the microphone means, wherein said speech registration/recognition processing means is manually selectable so as to subject this speech input signal to either a registration or a recognition processing, in which upon the registration processing the speech input signal is stored as recognition data and upon recognition processing the speech input signal is compared to the recognition data which has been stored;

speech record/reproduction processing means responsive to a speech input signal from the microphone means to subject this speech input signal to a record/reproduction processing, in which upon the record processing this speech input signal is recorded as a record signal and upon the reproduction processing the record signal is delivered as a reproduction signal in a given user voice, which has been pre-registered, in advance;

speaker means to which the reproduction signal is supplied;

mode designation means for delivering a registration or a recognition mode designation signal; and control means, in accordance with the registration or the recognition mode designation signal, for setting the speech registration/recognition processing means to the registration or the recognition processing mode and for setting the speech record/reproduction processing means to the record or the reproduction processing mode corresponding to the registration or the recognition processing mode in which the speech registration/recognition processing means is placed.

2. The speech recognition system according to claim 1, in which said speech input signal to be registered or recognized is data associated with a call from a telephone.

3. The speech recognition system according to claim 1, further comprising display means for displaying data associated with said speech input signal to be registered or recognized.

4. The speech recognition system according to claim 2, further comprising:

transmitting means for transmitting telephone number data corresponding to said recognition data to an outside system.

5. The speech recognition system according to claim 2, further comprising:

telephone number data registering means for initially registering telephone number data corresponding to a name of a telephone subscriber; and transmitting means for transmitting said telephone number data corresponding to said recognition data to a central system.

6. The speech recognition system according to claim 1, in which said speech registration/recognition processing means is of such a type that upon the registration processing said speech input signal from said microphone means is stored as a plurality of recognition data each having a different characteristic and upon the recognition processing said speech input signal is compared to said plurality of recognition data.

* * * * *